(12) United States Patent
Wachsman

(10) Patent No.: US 6,614,583 B1
(45) Date of Patent: Sep. 2, 2003

(54) VARIABLE OPTICAL DELAY

(75) Inventor: John M. Wachsman, Dublin, CA (US)

(73) Assignee: Genoa Corporation, Fremont, CA (US)

( * ) Notice: Subject to any disclaimer, the term of this patent is extended or adjusted under 35 U.S.C. 154(b) by 264 days.

(21) Appl. No.: 09/826,627

(22) Filed: Apr. 5, 2001

(51) Int. Cl.⁷ .............................. G02F 2/02; H04J 14/02; H04J 14/08
(52) U.S. Cl. ........................ 359/326; 359/124; 359/135; 359/140
(58) Field of Search .............................. 359/124, 135, 359/138, 140, 161, 326–332; 372/20

(56) References Cited

U.S. PATENT DOCUMENTS

| | | | | |
|---|---|---|---|---|
| 4,998,254 A | * | 3/1991 | Negus | 372/18 |
| 5,173,908 A | * | 12/1992 | Negus et al. | 372/18 |
| 5,212,698 A | * | 5/1993 | Kafka et al. | 372/18 |
| 6,091,525 A | * | 7/2000 | Cundiff | 359/130 |
| 6,522,450 B2 | * | 2/2003 | Zenteno | 359/260 |

* cited by examiner

Primary Examiner—John D. Lee

(57) ABSTRACT

A method and system for introducing optical delay. Using a tunable laser in combination with a group velocity dispersive element, laser tuning is used to create the desired amount of optical delay.

22 Claims, 4 Drawing Sheets

VARIABLE OPTICAL DELAY

FIELD OF THE INVENTION

The invention relates to optical delays, particularly to a variable optical delay using tunable laser sources.

BACKGROUND

In a conventional OTDM transmitter, several optical signals modulated at bit rate B using the same carrier frequency are multiplexed optically to form a composite optical signal at a higher bit rate nB, where n is the number of multiplexed optical channels.

Specifically, multiplexing of these n constituent bit streams is achieved by launching them into an optical fiber with time delays. The bit stream in the j-th channel is delayed optically by an amount $(j-1)/nB$, where $j=1, \ldots, n$. The outputs of all channels are combined to form a composite signal as a return-to-zero (RZ) signal. The composite bit stream has a bit slot $T=1/nB$. Furthermore, in the composite bit stream, n consecutive bits in each interval of duration $1/B$ belong to n different channels, as required by the TDM scheme.

The optical delays above are typically implemented by using fiber segments of controlled lengths. As an example, a 1 mm fiber length introduces a delay of about 5 ps. Moreover, the relative delay in each channel must be precisely controlled to ensure the proper alignment of bits belonging to different channels. For a precision typically required for a 40 Gb/s OTDM signal, the delay length should be controlled to within 20 μm.

However, as link rate increases beyond 40 Gbs, conventional optical delays (e.g., optical delays using fiber lengths) begin to experience problems such as inaccuracy and smeared time differentials between any two bits of the output composite signal launched into the optical fiber. Moreover, varying delay time of an optical signal typically requires replacing delay components. As such, varying delay times of different optical signals is cumbersome and error-prone.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is now made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
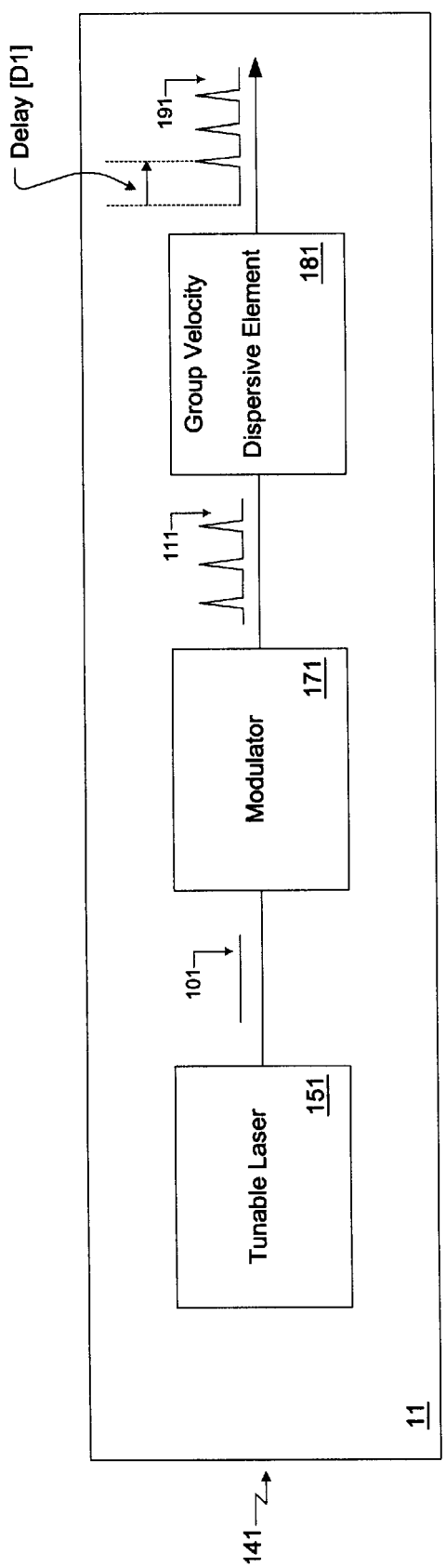
FIG. 1 shows a variable optical delay in accordance with one embodiment of the invention.

Referring now to FIG. 1, a variable optical delay 11 is shown in accordance with one embodiment of the invention. Variable optical delay 11 comprises a source 151, a modulator 171, and a group velocity dispersive element 181. As shown, source 151 is coupled to modulator 171 that is in turn coupled to group velocity dispersive element 181.

Referring still to FIG. 1, source 151 is a continuous wave (CW) tunable laser. In channel 141, source 151 provides to modulator 171 a tunable CW laser beam 101 of wavelength $\lambda 1$. Modulator 171 modulates laser beam 101 and generates therefrom an output RZ bit stream 111. Bit stream 111 undergoes group velocity dispersion through group velocity dispersive element 181 and emerges therefrom a RZ bit stream 191 having a time delay D1 as shown. Time delay D1 is produced by source tuning.

Variable optical delay 11 is typically disposed in an optical input channel 141 of an optical transmitter in order to introduce delay into the signal transiting optical input channel 141. For example, in one application of variable optical delay 11, bit stream 191 is generated in an input channel of an OTDM system. Specifically, bit stream 191 is generated as a constituent RZ bit stream 191 of a composite bit stream that is a composite of constituent bit stream 191 and other constituent bit streams (not shown) within the OTDM system. More specifically, constituent bit stream 191 is adapted to be time-division-multiplexed with the other constituent bit streams into the composite bit stream. As such, constituent bit stream 191 is a constituent of the composite bit stream, which is also a RZ bit stream.

In the present OTDM system, through source tuning, a time separation can be produced between each two consecutive bits on the composite bit stream, wherein each of these two bits is from a different bit stream. As such, to properly align constituent bit stream 191 with the other constituent bit streams of the composite bit stream, the proper optical delay amounts are introduced respectively into constituent bit stream 191 and other constituent bit streams. As will be described next, a time delay such as D1 is generated by tuning wavelengths $\lambda 1$ of sources 151.

Referring still to FIG. 1, source 151, being a CW tunable laser, produces a laser beam whose wavelength can be tuned. As such, $\lambda 1$ of source 151 is tuned for proper spacing of signal pulses between bit stream 191 and the other bit streams within the composite bit stream. Hence, by tuning $\lambda 1$ and wavelengths of other constituent bit streams, constituent bit stream 191 and the other constituent bit streams can be combined by a combiner into the composite bit stream, wherein the composite bit stream has the proper OTDM time spacing between every consecutive bits.

As understood herein, the bit stream for the optical delay need not be generated from a CW tunable laser with a modulator. For example, rather than a laser source being modulated by a modulator to generate the constituent bit streams, a tunable laser source that is directly modulated laser can be used to generate the bit stream. Accordingly, in another embodiment of the invention, the constituent bit stream for the optical delay is generated from a directly modulated laser source.

As understood herein, variable optical delay 11 need not be limited to applications to an OTDM system. Variable optical delay 11 can be implemented for introducing delay into any optical signal channel needing an optical delay. Moreover, variable optical delay 11 can be implemented for any optical signal channel needing the flexibility of varying the delay amount.

Figure 2:
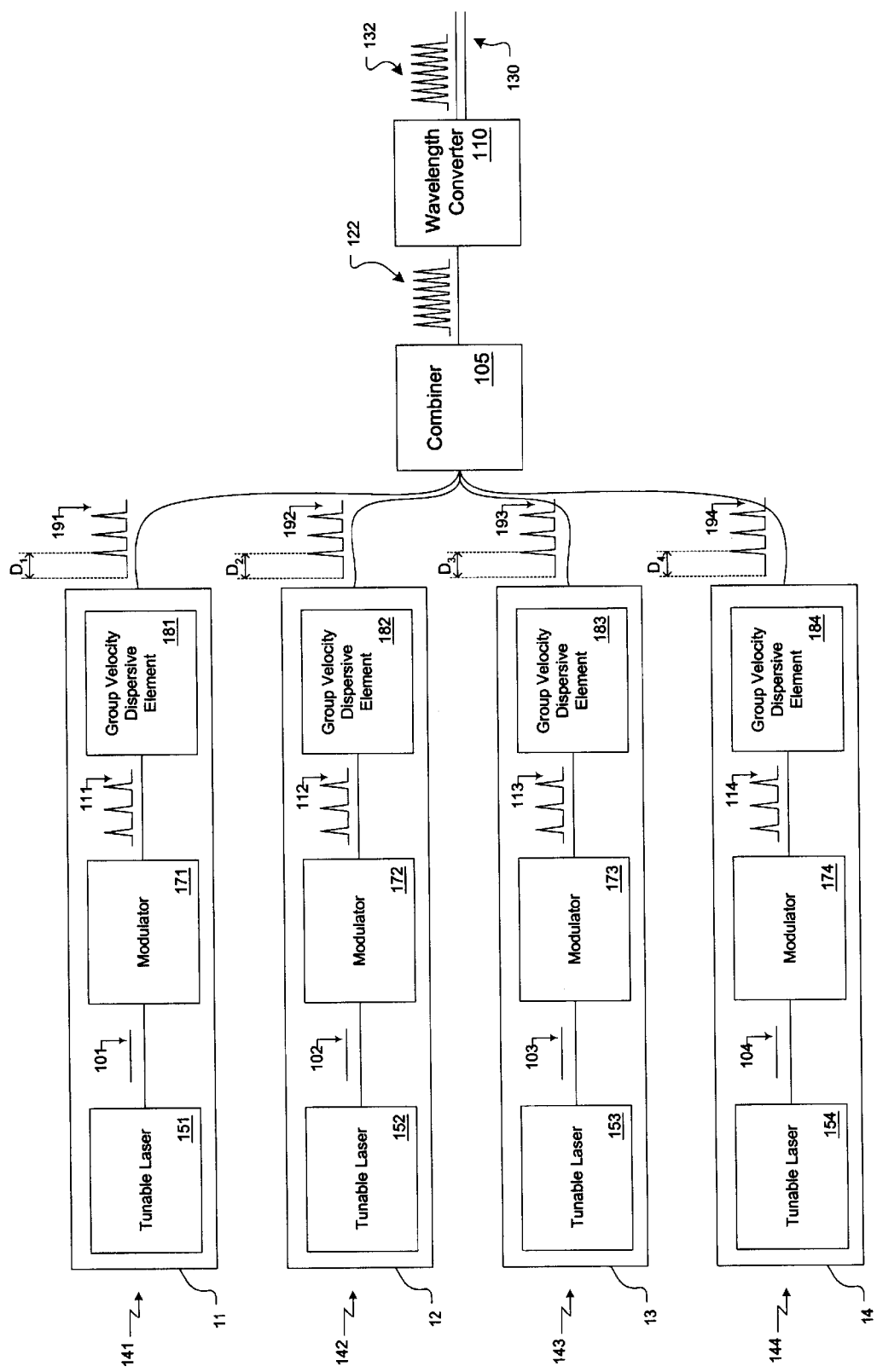
FIG. 2 shows an OTDM transmitter implementing variable optical delays in accordance with one embodiment of the invention.

Referring now to FIG. 2, an OTDM transmitter 100 is shown incorporating variable optical delays 11–14 in accordance with one embodiment of the invention. Transmitter 100 comprises four sources 151–154, four modulators 171–174, four group velocity dispersive elements 181–184. These sources (151–154), modulators (171–174) and group velocity dispersive elements (181–184) are arranged as four variable optical delays 11–14 respectively for four input channels 141–144 of transmitter 100. Transmitter 100 also comprises a combiner 105 and a wavelength converter 110. Furthermore, transmitter 100 is coupled to an optical link 130.

As shown in variable optical delay D1 disposed within channel 141, source 151 is coupled to modulator 171 that is in turn coupled to group velocity dispersive element 181. Similarly, variable optical delays D2–D4 (respectively of channel 142–144) are formed wherein sources 152–154 are coupled respectively to modulator 172–174 that are in turn coupled respectively to group velocity dispersive elements 182–184.

Referring still to FIG. 2, sources 151–154 are continuous wave (CW) tunable lasers. For variable optical delay D1 in channel 141, source 151 provides to modulator 171 a tunable CW laser beam 101 of wavelength $\lambda 1$. Modulator 171 modulates laser beam 101 and generates therefrom an output RZ bit stream 111. Bit stream 111 undergoes group velocity dispersion through group velocity dispersive element 181 and emerges therefrom as a constituent RZ bit stream 191 of a composite bit stream 122.

Similarly, for variable optical delay D2 in channel 142, constituent RZ bit stream 192 is generated from a CW tunable laser beam 102 of wavelength $\lambda 2$ that undergoes modulation (at modulator 172) and group velocity dispersion (at group velocity dispersive element 182). For variable optical delay D3 in channel 143, constituent RZ bit stream 193 is generated from a CW tunable laser beam 103 of wavelength $\lambda 3$ that undergoes modulation at (modulator 173) and group velocity dispersion (at group velocity dispersive element 183). For variable optical delay D4 in channel 144, constituent RZ bit stream 194 is generated from a CW tunable laser beam 104 of wavelength $\lambda 4$ that undergoes modulation (at modulator 174) and group velocity dispersion (all group velocity dispersive element 184).

Constituent bit streams 191–194 are adapted to be time-division-multiplexed into composite bit stream 122. As such, they are constituents of composite bit stream 122, which is also a RZ bit stream. These constituent bit streams (191–194) are first combined at combiner 105, resulting in composite bit stream 122 as the output of combiner 105. Composite bit stream 122 undergoes modification within wavelength converter 110 and emerges therefrom as a composite bit stream 132 having a wavelength $\lambda v$ adapted for transmission on optical link 130.

As understood herein, wavelengths $\lambda 1$, $\lambda 2$, $\lambda 3$ and $\lambda 4$ need not be the same. As such, in an alternative embodiment where $\lambda 1$, $\lambda 2$, $\lambda 3$ and $\lambda 4$ are not be the same, a wavelength multiplexer can be used instead of a combiner such as combiner 105.

For an OTDM transmitter in accordance with the present embodiment, each of the optical signals (constituent bit streams) is modulated at approximately bit rate B. These bit streams are time-division-multiplexed optically to form a composite optical signal at a higher bit rate nB, where n is the number of multiplexed optical channels. Specifically, time-division-multiplexing of these n constituent bit streams into composite bit stream 122 is achieved by launching them into an optical fiber with time delays. The modulated bit stream in the j-th channel is delayed optically by an amount $Dj=(j-1)/nB$, where j=1, . . . , n. The outputs of all channels are combined to form a composite signal as a pulsed signal such as a RZ signal. The multiplexed composite bit stream has a bit slot T=1/nB. Furthermore, in the composite bit stream, n consecutive bits in each interval of duration 1/B belong to n different channels, as required by the TDM scheme.

Specifically, continuing with FIG. 2, in the present embodiment, each of optical signals (bit streams 111–114) is modulated at approximately bit rate B (=10 Gb/s). Bit streams 111–114 are time-division-multiplexed optically to form composite bit stream 122 at a higher bit rate nB (=40 Gb/s), where n (=4) is the number of multiplexed optical channels 141–144. Specifically, time-division-multiplexing of these n (=4) constituent bit streams 191–194 into composite bit stream 122 is achieved by launching them consecutively into optical link 130 with time delays. The modulated bit stream in the j-th channel is delayed optically by an amount (j–1)/(40 Gb/s), where j=1, 2, 3 and 4. The outputs of all channels are combined to form time-division-multiplexed composite signal 122 as a pulsed signal such as a Rz signal. The multiplexed composite bit stream has a bit slot T=1/(40 Gb/s). Furthermore, in the composite bit stream, 4 consecutive bits in each interval of duration 1/(10 Gb/s) belong respectively to 4 different channels 141–144, as required by the TDM scheme. As such, OTDM transmitter 100 outputs composite RZ bit stream 132 as a 40 Gb/s RZ bit stream that is launched into optical link 130 for optical transmission.

In the present embodiment, through time delays D1–D4 produced by source tuning, a time separation of 1/(40 Gb/s) can be produced between each two consecutive bits on composite bit streams 122 and 132. A such, to properly align constituent bit streams 191–194 as they are combined to form composite bit stream 122, the optical delay amounts of D1=0/(40 Gb/s), D2=1/(40 Gb/s), D3=2/(40 Gb/s), and D4=3/(40 Gb/s) are introduced respectively into constituent bit streams 191–194. As described next, these time delays are implemented by tuning wavelengths $\lambda 1$, $\lambda 2$, $\lambda 3$ and $\lambda 4$ (of sources 151–154 respectively).

Referring still to FIG. 2, each of sources 151–154, being a CW tunable laser, produces a laser beam whose wavelength can be tuned. As such, $\lambda 1$ of source 151 and $\lambda 2$ of source 152 are tuned for proper spacing of signal pulses between bit stream 191 and bit stream 192 within composite bit streams 122 and 132. Specifically, $\lambda 1$ and $\lambda 2$ are tuned to produce respectively bit streams 111–112 so that a time differential of T=1/(40 Gb/s) separates signal pulses of bit streams 191–192 as they emerge respectively from dispersive elements 181–182. Similarly, $\lambda 2$ and $\lambda 3$ are tuned to produce respectively bit streams 112–113 so that a time differential of T=1/(40 Gb/s) separates signal pulses of bit streams 192–193 as they emerge respectively from dispersive elements 182–183. $\lambda 3$ and $\lambda 4$ are tuned to produce respectively bit streams 113–114 so that a time differential of T=1/(40 Gb/s) separates signal pulses of bit streams 193–194 as they emerge respectively from dispersive elements 183–184. Hence, by tuning $\lambda 1$, $\lambda 2$, $\lambda 3$ and $\lambda 4$, constituent bit streams 191–194 can be combined by combiner 105 into composite bit stream 122 that has the proper OTDM time spacing between every consecutive bits.

In the present embodiment, wavelength converter 110 is implemented with a vertical lasing semiconductor optical amplifier (VLSOA) whose vertical laser has wavelength λv. Specifically, as wavelength converter 110, VLSOA's vertical lasing generates composite bit stream 132 of wavelength λv. As such, as composite bit stream 132 emerges from wavelength converter 110, its wavelength λv is independent of various wavelengths (λ1, λ2, λ3 and λ4) contained within composite bit stream 122. Moreover, composite bit stream 132 is amplified because of the amplifying function of wavelength converter 110 implemented as a VLSOA.

However, as understood herein, wavelength converter 110 need not be implemented with a VLSOA. For example, in one embodiment of the invention, wavelength converter 110 is implemented with four-wave mixing. In another embodiment, wavelength converter 110 is implemented with a semiconductor optical amplifier (SOA). In yet another embodiment of the invention, wavelength converter 110 is implemented with a Mach-Zehner-SOA (MZ-SOA).

Also, as understood herein, channels 141–144 need not be 10 Gb/s per channels. For example, in another embodiment, each of bit streams (111–114) is modulated at approximately 40 Gb/s, thereby resulting in composite bit stream 132 that is approximately 160 Gb/s. Moreover, as understood herein, the present embodiment need not be implemented with n (=4) input channels such as channels 141–144. For example, in another embodiment, n (not=4) channels are time-division-multiplexed.

Furthermore, as understood herein, the constituent bit streams need not be generated from CW tunable lasers with modulators. For example, rather than the laser sources being modulated by modulators to generate the constituent bit streams, tunable laser sources that are directly modulated lasers can be used to generate the constituent bit streams. Accordingly, in another embodiment of the invention, the constituent bit streams are generated from directly modulated laser sources.

Figure 3:
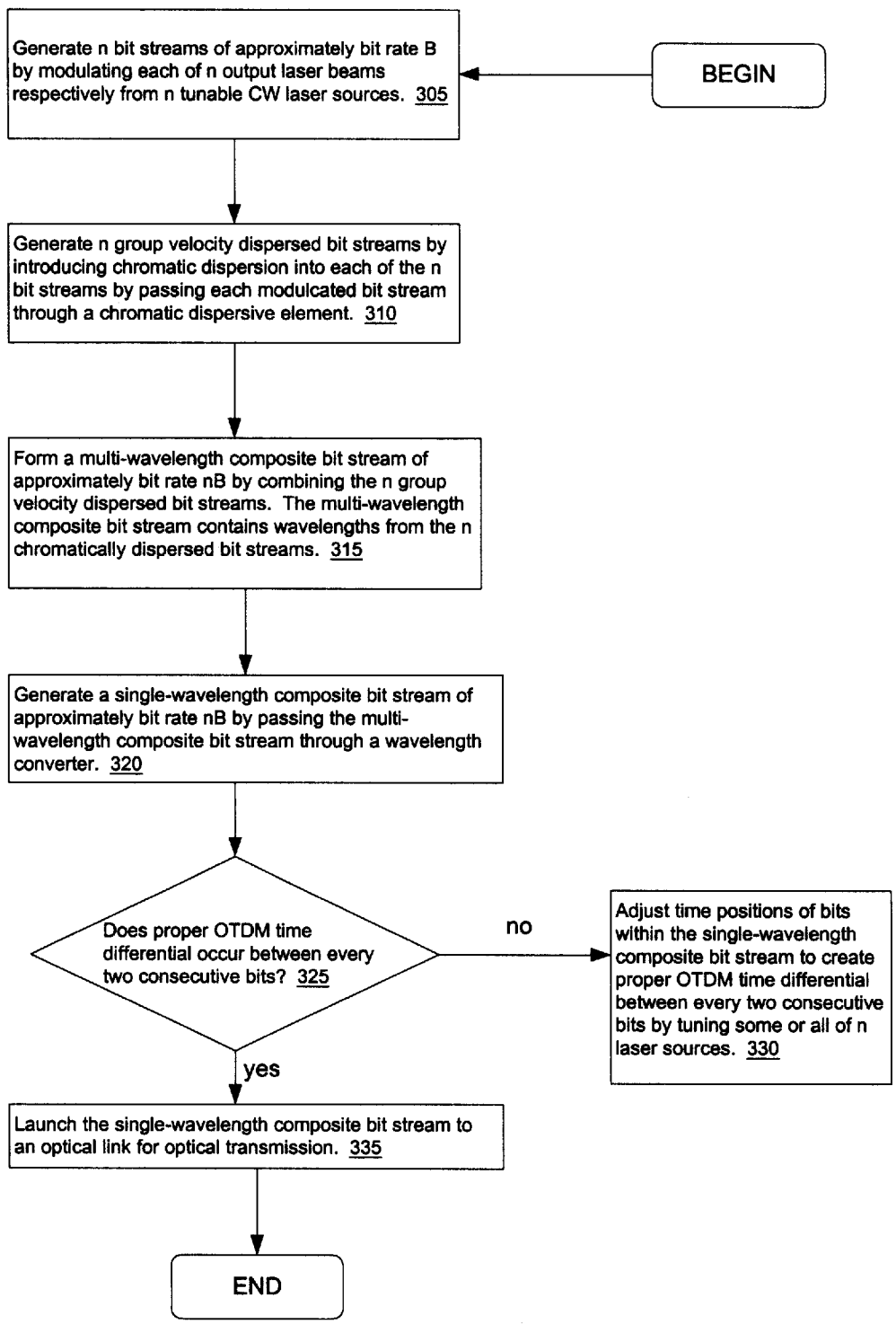
FIG. 3 is a flow chart outlining steps for performing optical delay in accordance with one embodiment of the invention.

Referring now to FIG. 3, a flow chart 300 is shown outlining steps in performing variable optical delay for OTDM transmission in accordance with one embodiment of the invention.

In step 305, n bit streams of approximately bit rate B are generated by modulating each of n output laser beams respectively from n tunable CW laser sources. However, as understood herein, these n bit streams need not be generated as such. For example, in another embodiment of the invention, these n bit streams can be generated from n tunable laser sources that are directly modulated.

In step 310, n group velocity dispersed bit streams are generated by introducing group velocity dispersion into each of the n bit streams by passing each modulated bit streams through a group velocity dispersive element.

In step 315, a multi-wavelength composite bit stream of approximately bit rate nB is formed by combining the n group velocity dispersed bit streams. The multi-wavelength composite bit stream contains wavelengths from the n group velocity dispersed bit streams.

In step 320, a single-wavelength composite bit stream of approximately bit rate nB is generated by passing the multi-wavelength composite bit stream through a wavelength converter. The single-wavelength composite bit stream has wavelength adapted for optical transmission by a optical link. In the present embodiment, the wavelength converter is implemented with a VLSOA. However, as understood herein, in one embodiment of the invention, the wavelength converter is implemented with a SOA. In another embodiment of the invention, the wavelength converter is implemented with a MZ-SOA. In yet another embodiment of the invention, the wavelength converter is implemented with four-wave-mixing.

In query step 325, either the multi-wavelength composite bit stream or the single-wavelength composite bit stream is examined to see if a proper OTDM time differential occurs between every two consecutive bits. If yes, then step 335 is implemented. If no, then step 330 is performed.

In step 330, time positions of bits within the single-wavelength composite bit stream are adjusted to create proper OTDM time differential between every two consecutive bits by tuning some or all of n tunable laser sources. Query step 225 is then performed again.

In step 335, the single-wavelength composite bit stream is launched to an optical link for optical transmission.

Figure 4:
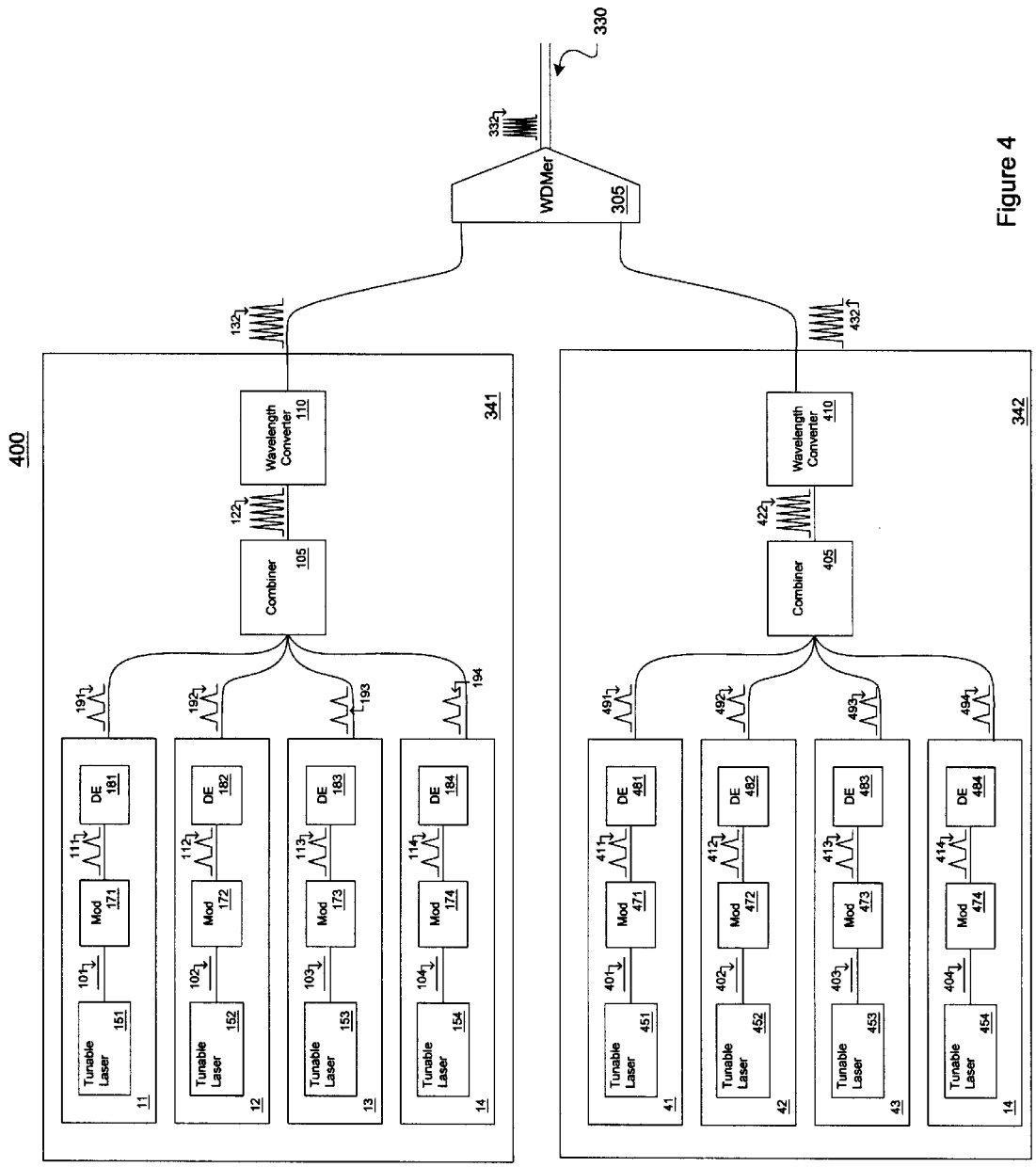
FIG. 4 shows a WDM system implementing variable optical delays in accordance with one embodiment of the invention.

Referring now to FIG. 4, implementation of variable optical delays in a wave-division-multiplexing (WDM) system 400 incorporating OTDM channels 341–342 is shown in accordance with one embodiment of the invention. WDM system 400 comprises input OTDM channels 341–342, a WDM multiplexer 305 and an optical link 330. Channel 341 contains a composite 4B Gb/s bit stream 132 (λv) resulting from performing OTDM on four B Gb/s bit streams 191–194 (respectively λ1, λ2, λ3 and λ4) in accordance with one embodiment of the invention. Channel 342 contains a composite 4B Gb/s bit stream 432 (λv') resulting from performing OTDM on four B Gb/s bit streams 491–494 (respectively λ1', λ2', λ3' and λ4') in accordance with one embodiment of the invention.

Continuing with FIG. 4, channel 341 is coupled to WDM multiplexer 305; channel 342 is also coupled to WDM multiplexer 305. WDM multiplexer 305 is in turn coupled to optical link 330. Composite bit stream 132 of λv and composite bit stream 432 of λv' are wavelength-division-multiplexed to form a composite bit stream 332 having a bandwidth of 8B Gb/s, and carrying wavelengths of λv and λv'.

As understood herein, wavelengths λ1, λ2, λ3 and λ4 need not be the same. Similarly, wavelengths λ1', λ2', λ3' and λ4' need not be the same. As such, in an alternative embodiment wherein λ1, λ2, λ3 and λ4 are not be the same, and wherein λ1', λ2', λ3' and λ4' are not the same, wavelength multiplexers can be used instead of combiners.

Specifically, composite bit stream 132 as shown in FIG. 4 is generated by OTDM performed using variable optical delays in accordance with the embodiment described in FIG. 2. Similarly, composite bit stream 432 as shown in FIG. 4 is generated by OTDM performed using variable optical delays in accordance with the embodiment described in FIG. 2.

As understood herein, WDM system 400 need not be limited to two OTDM channels 341–342 as shown. For example, in one embodiment, a WDM system is implemented with m OTDM channels. As such, an optical signal having bandwidth of 4MB Gb/s is transmitted by the WDM system to an optical link. Moreover, in another embodiment, a WDM system is implemented with m OTDM channels wherein each OTDM channel carries a composite bit stream formed by time-division-multiplexing n bit streams. As such, an optical signal having bandwidth of mnB Gb/s is transmitted by the WDM system to an optical link.

In the present embodiment, the wavelength converters 110 and 410 are implemented with VLSOAs. However, as understood herein, in one embodiment of the invention, the wavelength converters 110 and 410 are implemented with SOAs. In another embodiment of the invention, the wavelength converters 110 and 410 are implemented with MZ-SOAs. In yet another embodiment of the invention, the wavelength converters 110–410 are implemented with four-wave-mixings.

Furthermore, as understood herein, the constituent bit streams need not be generated from CW tunable lasers with modulators. For example, rather than the laser sources being modulated by modulators to generate the constituent bit streams, tunable laser sources that are directly modulated lasers can be used to generate the constituent bit streams. Accordingly, in another embodiment of the invention, the constituent bit streams are generated from directly modulated laser sources.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. An optical delay comprising:
   a tunable laser source adapted to provide a bit stream of approximately B Gb/s; and
   a group velocity dispersive element coupled to said tunable laser source, said group velocity dispersive element introducing group velocity dispersion into said bit stream to generate a delayed bit stream, wherein the delay amount of said delayed bit stream can be varied by tuning said tunable laser source.

2. The optical delay of claim 1, wherein return-to-zero (RZ) format is used in generating bit streams.

3. The optical delay of claim 1, wherein said B Gb/s is 10 Gb/s.

4. The optical delay of claim 1, wherein said B Gb/s is 40 Gb/s.

5. The optical delay of claim 1, wherein said tunable laser source is a tunable CW laser that is coupled to a modulator, said modulator modulating a laser beam generated from said tunable laser source into said bit stream.

6. The optical delay of claim 1, wherein said tunable laser source is a directly modulated tunable laser that generates said bit stream.

7. A method for introducing optical delay in performing optical time-division multiplexing (OTDM), said method comprising the steps of:
   a) generating n bit streams of approximately B Gb/s from n tunable lasers having respectively initial wavelengths of $\lambda 1, \lambda 2, \ldots$ and $\lambda n$; and
   b) generating from said n bit streams n delayed bit streams by introducing group velocity dispersion into said n bit streams, wherein n delay amounts D1, D2 . . . and Dn respectively of said n delayed bit streams can be varied by tuning respectively said n tunable lasers.

8. The method of claim 7, further comprising the steps of:
   c) combining said n delayed bit streams into a composite bit stream of approximately nB Gb/s; and
   d) in response to misalignment of bits within said composite bit stream, tuning said $\lambda 1, \lambda 2, \ldots$ and $\lambda n$ for adjusting said delay amounts D1, D2 and Dn to create OTDM time differential between consecutive bits within said composite bit stream.

9. The method of claim 7, further comprising the steps of:
   e) generating a single-wavelength composite bit stream of approximately wavelength $\lambda v$ and nB Gb/s by wavelength converting said composite bit stream with a wavelength converter; and
   f) in response to misalignment of bits within said single-wavelength composite bit stream, tuning said $\lambda 1, \lambda 2, \ldots$ and $\lambda n$ for adjusting said delay amounts D1, D2 . . . and Dn to create OTDM time differential between consecutive bits within said single-wavelength composite bit stream.

10. The method of claim 7, wherein return-to-zero (RZ) format is used in generating bit streams.

11. The method of claim 7, wherein said B Gb/s is 10 Gb/s, and wherein said n is 4.

12. The method of claim 7, wherein said B Gb/s is 40 Gb/s, and wherein said n is 4.

13. The method of claim 7, wherein said n tunable lasers generate respectively n continuous wave (CW) laser beams that are modulated respectively to generate said n bit streams respectively.

14. The method of claim 7, wherein said n tunable lasers are directly modulated tunable lasers that generates respectively said n bit streams.

15. A WDM system, comprising:
   a) m OTDM channels, wherein for k=1 to m, the k-th OTDM channel comprises:
      k1) n channels of bit streams Dk1, Dk2, . . . and Dkn having respectively wavelengths of $\lambda k1, \lambda k2, \ldots$ and $\lambda kn$, wherein for j=1 to n of said n channels Vk1, Vk2, . . . and Vkn, the j-th channel Vkj having a variable optical delay Xkj that comprises:
         kj1) a tunable laser source Skj providing a bit stream Bkj of approximately B Gb/s; and
         kj2) a group velocity dispersive element Ekj coupled to said Skj, said Ekj introducing group velocity dispersion into said Bkj to generate said Dkj, wherein said optical delay Xkj can be varied by tuning respectively said Skj;
      k2) a combiner coupled to said n channels and adapted to optically combine said n bit streams Dk1, Dk2 . . . and Dkn into a composite bit stream Uk; and
      k3) a wavelength converter coupled to said combiner and adapted to convert said composite bit stream Uk into a single-wavelength composite bit stream Ak of wavelength $\lambda vk$, wherein OTDM time differential between consecutive bits of said Ak can be created by tuning $\lambda k1, \lambda k2, \ldots$ and $\lambda kn$; and
   b) a WDM multiplexer coupled to said m OTDM channels, said WDM multiplexer adapted to generate a composite optical signal from A1, A2 . . . and Am with a bandwidth of approximately mnB Gb/s.

16. The WDM system of claim 15, wherein return-to-zero (RZ) format is used in generating bit streams.

17. The WDM system of claim 15, wherein said B Gb/s is 10 Gb/s, and wherein said n is 4.

18. The WDM system of claim 15, wherein said B Gb/s is 40 Gb/s, and wherein said n is 4.

19. The method of claim 9 or the system of claim 15, wherein said wavelength converter is a vertical lasing semiconductor optical amplifier (VLSOA), and wherein said single-wavelength is generated from the vertical lasing of said VLSOA.

20. The method of claim 9 or the system of claim 15, wherein said wavelength converter is a four-wave-mixing.

21. The method of claim 9 or the system of claim 15, wherein said wavelength converter is MZ-SOA.

22. The method of claim 9 or the system of claim 15, wherein said wavelength converter is a SOA.

* * * * *